(12) United States Patent
Elwart

(10) Patent No.: US 8,627,858 B2
(45) Date of Patent: *Jan. 14, 2014

(54) METHODS AND SYSTEMS FOR SELECTIVELY FUELLING A VEHICLE

(75) Inventor: Shane Elwart, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 876 days.

This patent is subject to a terminal disclaimer.

(21) Appl. No.: 12/402,999

(22) Filed: Mar. 12, 2009

(65) Prior Publication Data

US 2010/0230001 A1  Sep. 16, 2010

(51) Int. Cl.
  *B65B 1/30* (2006.01)
  *B67C 3/02* (2006.01)
  *F02M 43/00* (2006.01)
  *F16K 31/12* (2006.01)
  *G01N 33/22* (2006.01)

(52) U.S. Cl.
  USPC ............. 141/83; 141/104; 123/304; 137/485; 701/103; 73/35.02; 73/114.38

(58) Field of Classification Search
  USPC .............. 141/35, 83, 104, 392; 123/304, 1 A, 123/431, 466, 198 A, 406.3, 406.31, 494, 123/575; 700/270–273, 282; 73/863.12, 73/35.02, 114.38; 137/485; 701/102, 103
  See application file for complete search history.

(56) References Cited

U.S. PATENT DOCUMENTS

| 4,031,864 | A | | 6/1977 | Crothers |
| 4,682,293 | A | * | 7/1987 | Goldenberg et al. ......... 701/104 |
| 4,852,982 | A | | 8/1989 | Reid |
| 5,092,305 | A | | 3/1992 | King |
| 5,204,819 | A | * | 4/1993 | Ryan .............................. 705/413 |
| 5,411,058 | A | | 5/1995 | Welsh et al. |
| 5,560,344 | A | | 10/1996 | Chan |
| 5,921,263 | A | * | 7/1999 | Negley, III ........................ 137/3 |
| 6,167,920 | B1 | | 1/2001 | Enge |
| 6,216,755 | B1 | * | 4/2001 | Neufert .......................... 141/392 |
| 6,382,270 | B1 | * | 5/2002 | Gzik .............................. 141/94 |
| 6,601,617 | B2 | * | 8/2003 | Enge ................................ 141/7 |
| 6,711,893 | B2 | | 3/2004 | Ueda et al. |
| 6,712,102 | B2 | * | 3/2004 | Zerangue, Sr. .................. 141/83 |
| 6,951,202 | B2 | * | 10/2005 | Oda ......................... 123/406.29 |

(Continued)

FOREIGN PATENT DOCUMENTS

| CN | 1704577 A | 12/2005 |
| CN | 101191447 A | 6/2008 |

OTHER PUBLICATIONS

U.S. Appl. No. 12/403,259, filed Mar. 12, 2009, Elwart et al.

(Continued)

*Primary Examiner* — Ryan Reis

(74) *Attorney, Agent, or Firm* — Julia Voutyras; Alleman Hall McCoy Russell & Tuttle LLP

(57) ABSTRACT

Methods and systems for selectively fuelling a vehicle are provided. One example method of fuelling a vehicle may include receiving a fuel in a fuel reservoir in the vehicle, and directing the fuel to one of a plurality of storage tanks based on a fuel type. In one example, the directing of fuel may include adjusting one or more fuelling valves positioned between the fuel reservoir and the plurality of storage tanks to vary a direction of fuel flow to the plurality of storage tanks.

14 Claims, 5 Drawing Sheets

(56) References Cited

U.S. PATENT DOCUMENTS

| | | | |
|---|---|---|---|
| 7,013,844 B2* | 3/2006 | Oda | 123/3 |
| 7,258,098 B2* | 8/2007 | Kim | 123/198 D |
| 7,406,871 B2* | 8/2008 | Sugiura | 73/592 |
| 7,726,265 B2* | 6/2010 | Bromberg et al. | 123/1 A |
| 7,735,476 B2* | 6/2010 | Carr et al. | 123/495 |
| 2005/0103285 A1 | 5/2005 | Oda | |
| 2005/0252489 A1* | 11/2005 | Moody | 123/435 |
| 2006/0102136 A1* | 5/2006 | Bromberg et al. | 123/198 A |
| 2006/0102146 A1* | 5/2006 | Cohn et al. | 123/406.29 |
| 2007/0012091 A1 | 1/2007 | Kim | |
| 2007/0092770 A1 | 4/2007 | Obata et al. | |
| 2007/0151331 A1 | 7/2007 | Kawanishi et al. | |
| 2007/0215127 A1 | 9/2007 | Dearth et al. | |
| 2008/0072881 A1 | 3/2008 | Leone et al. | |
| 2009/0199626 A1* | 8/2009 | Murphy et al. | 73/114.38 |
| 2009/0222194 A1* | 9/2009 | Bowman et al. | 701/103 |
| 2009/0292443 A1* | 11/2009 | Stein et al. | 701/103 |
| 2010/0155322 A1* | 6/2010 | Partridge et al. | 210/321.6 |
| 2010/0229966 A1 | 9/2010 | Elwart et al. | |
| 2011/0137470 A1* | 6/2011 | Surnilla et al. | 700/282 |

OTHER PUBLICATIONS

Partial Translation of Office Action of Chinese Application No. 201010133549.X, Issued Sep. 3, 2013, State Intellectual Property Office of PRC, 13 Pages.

Partial Translation of Office Action of Chinese Application No. 201010133500A, Issued Oct. 22, 2013, State Intellectual Property Office of PRC, 12 pages.

* cited by examiner

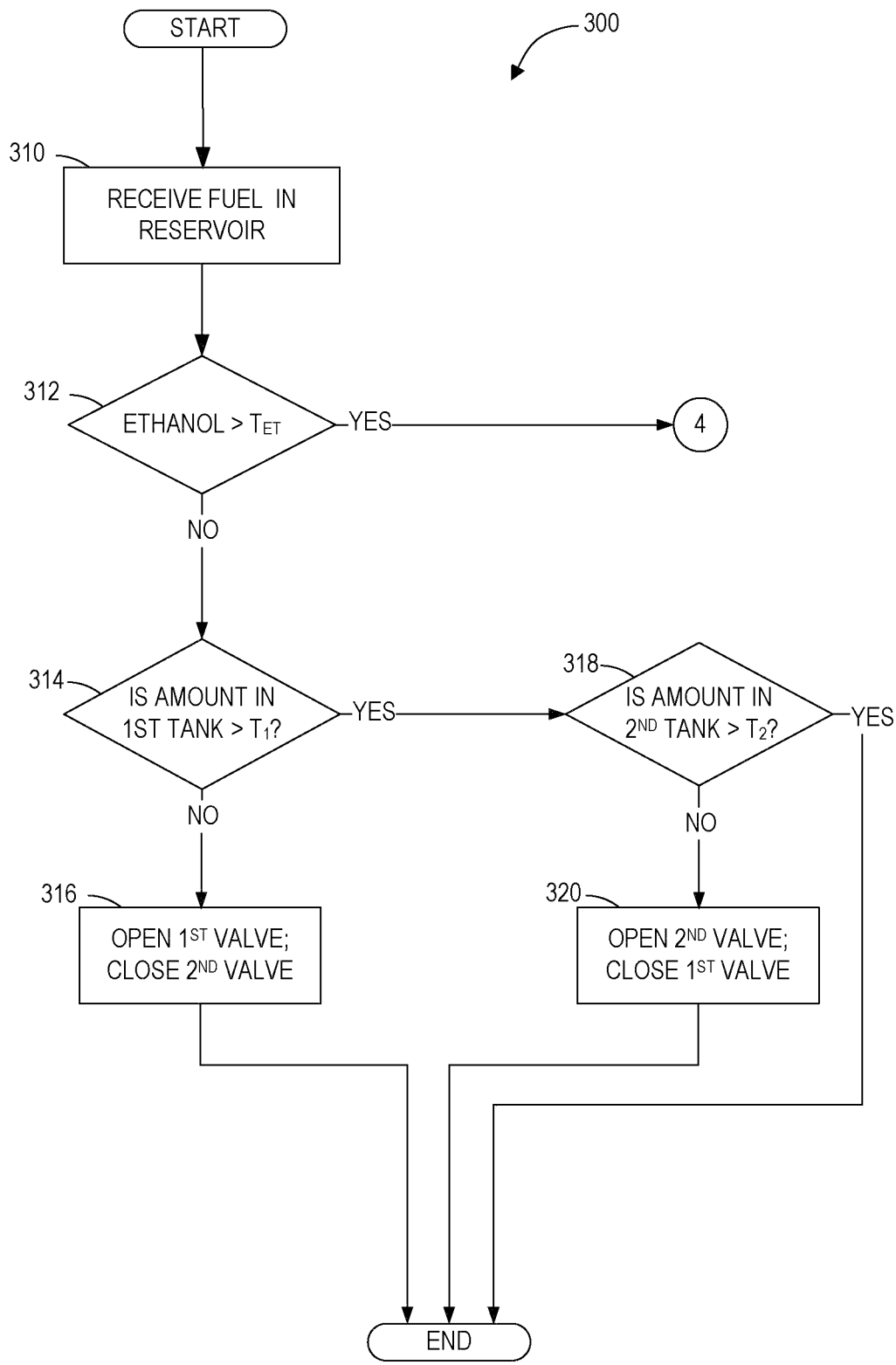

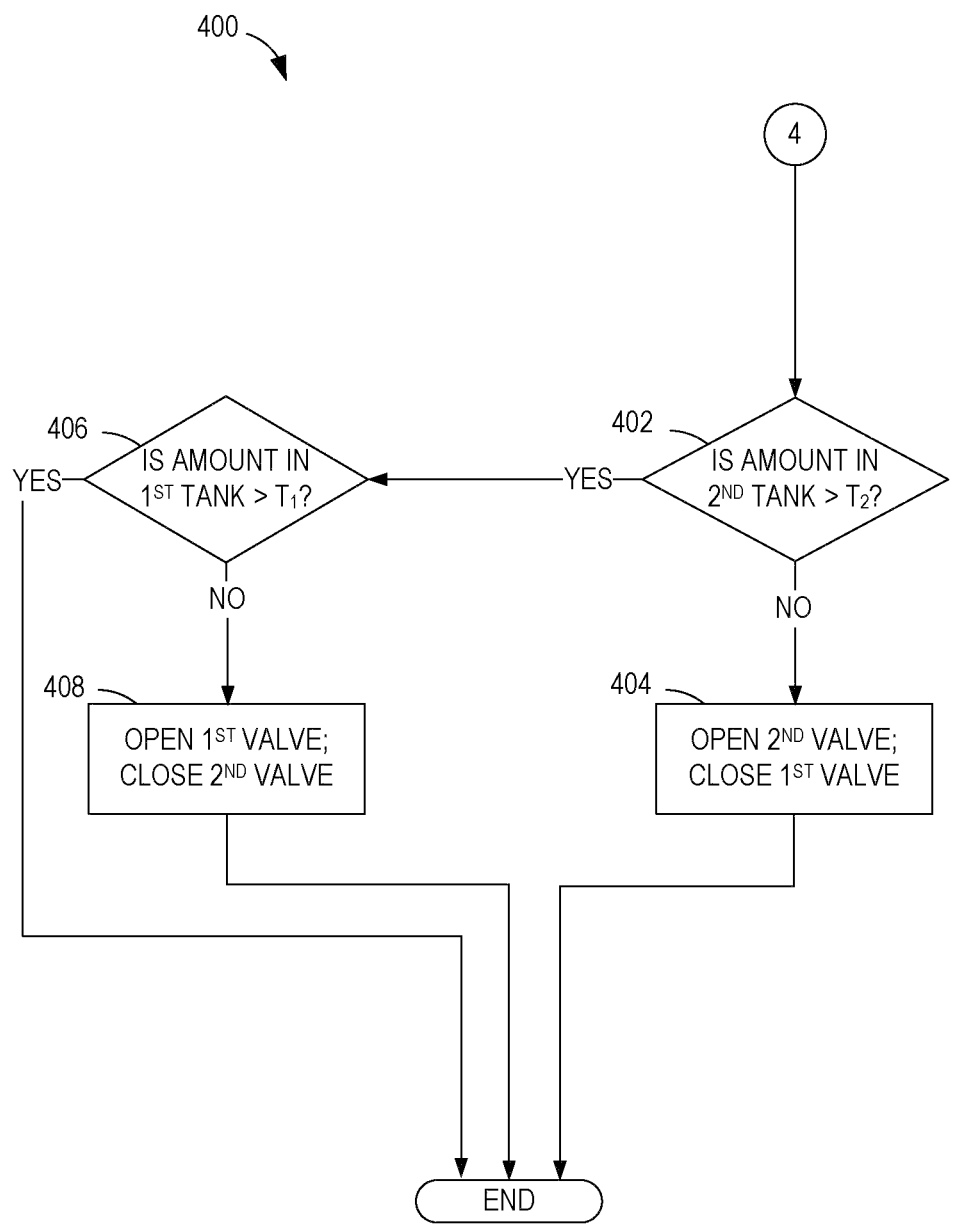

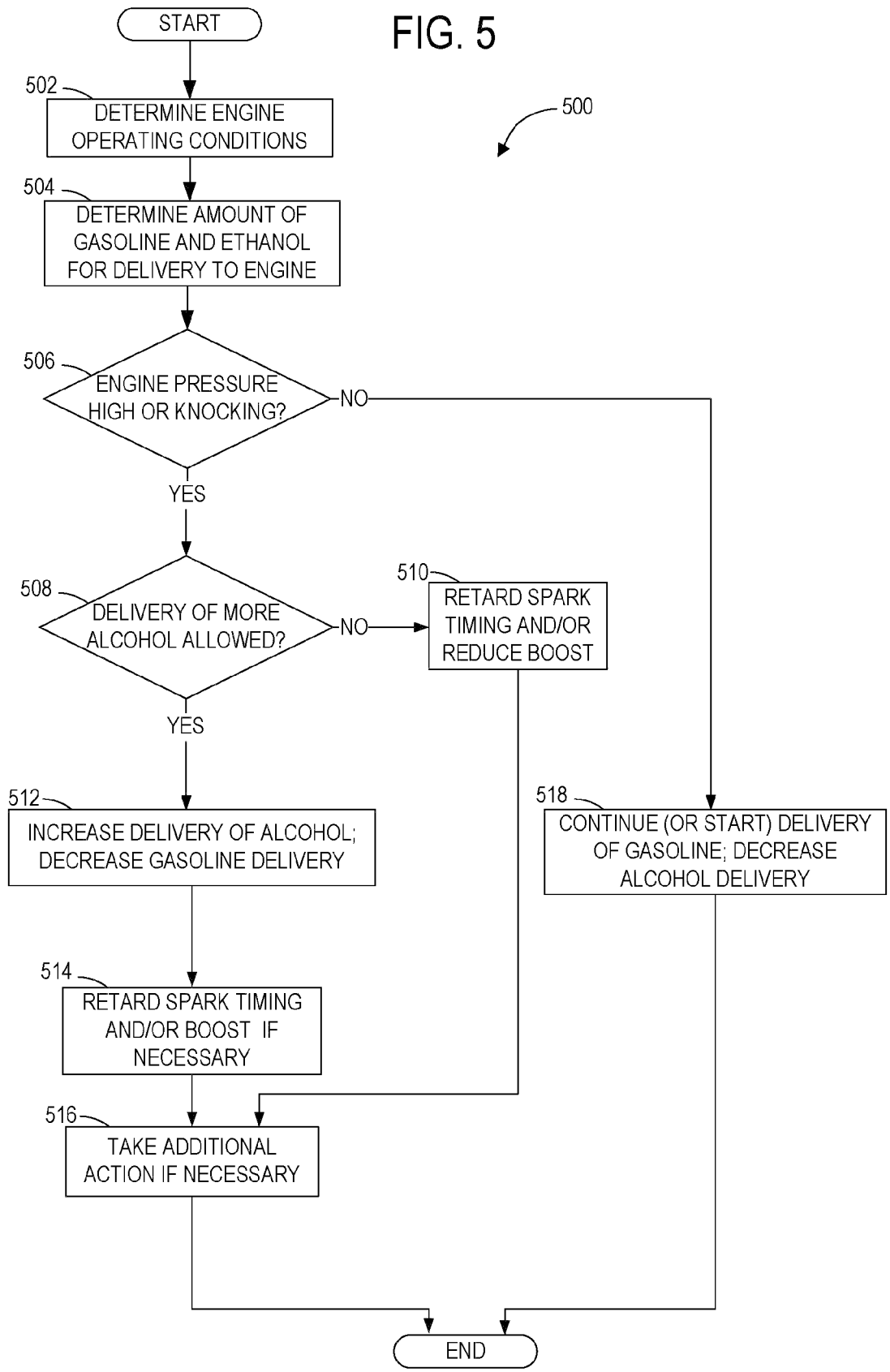

METHODS AND SYSTEMS FOR SELECTIVELY FUELLING A VEHICLE

FIELD

The present invention relates to methods and systems for selectively fuelling a vehicle with more than one fuel storage tank.

SUMMARY AND BACKGROUND

Recently, there has been an increased interest in using more than one fuel type to fuel a vehicle engine, such that different fuels can be used under different engine operating conditions.

A system for fuelling a vehicle with two fuel tanks and a single filler port fitting is described in U.S. Pat. No. 4,852,892 (Reid). The system includes a Y-junction in the fuel line such that a user can manually direct a fuel filling hose to fill one of two tanks.

The inventors have recognized a problem with the above solution in that a user may incorrectly direct the fuel filling hose, resulting in unintended delivery of fuel to an improper storage tank, as one example. It can be difficult for vehicle users to consistently follow fuelling directions correctly, even when proper labeling exists. When a user incorrectly directs the fuel filling hose, accidental mixing of fuels can result, as well as improper usage of a fuel type by the engine, as some examples.

A method for selectively fuelling a vehicle is herein provided. One example method includes receiving a fuel in a fuel reservoir in the vehicle, and directing the fuel to one of a plurality of storage tanks based on a fuel type.

By directing the fuel based on at least one characteristic of the fuel in the fuel reservoir, appropriate storage of fuels may be ensured, thereby preventing the mixing of fuels in fuel tanks, as well as preventing improper usage of a fuel type by the engine due to incorrect storage of fuel. Specifically, by selectively directing the fuel after detecting the fuel type supplied by an operator, the risk of operator error, wherein a particular fuel type is supplied to an incompatible or improper fuel tank, is reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3-4 are flowcharts illustrating example methods for selectively fuelling a vehicle.

FIG. 5 is a flowchart illustrating an example method for selectively delivering fuel from one or more storage tanks to the engine.

DETAILED DESCRIPTION OF THE DRAWINGS

Figure 1:
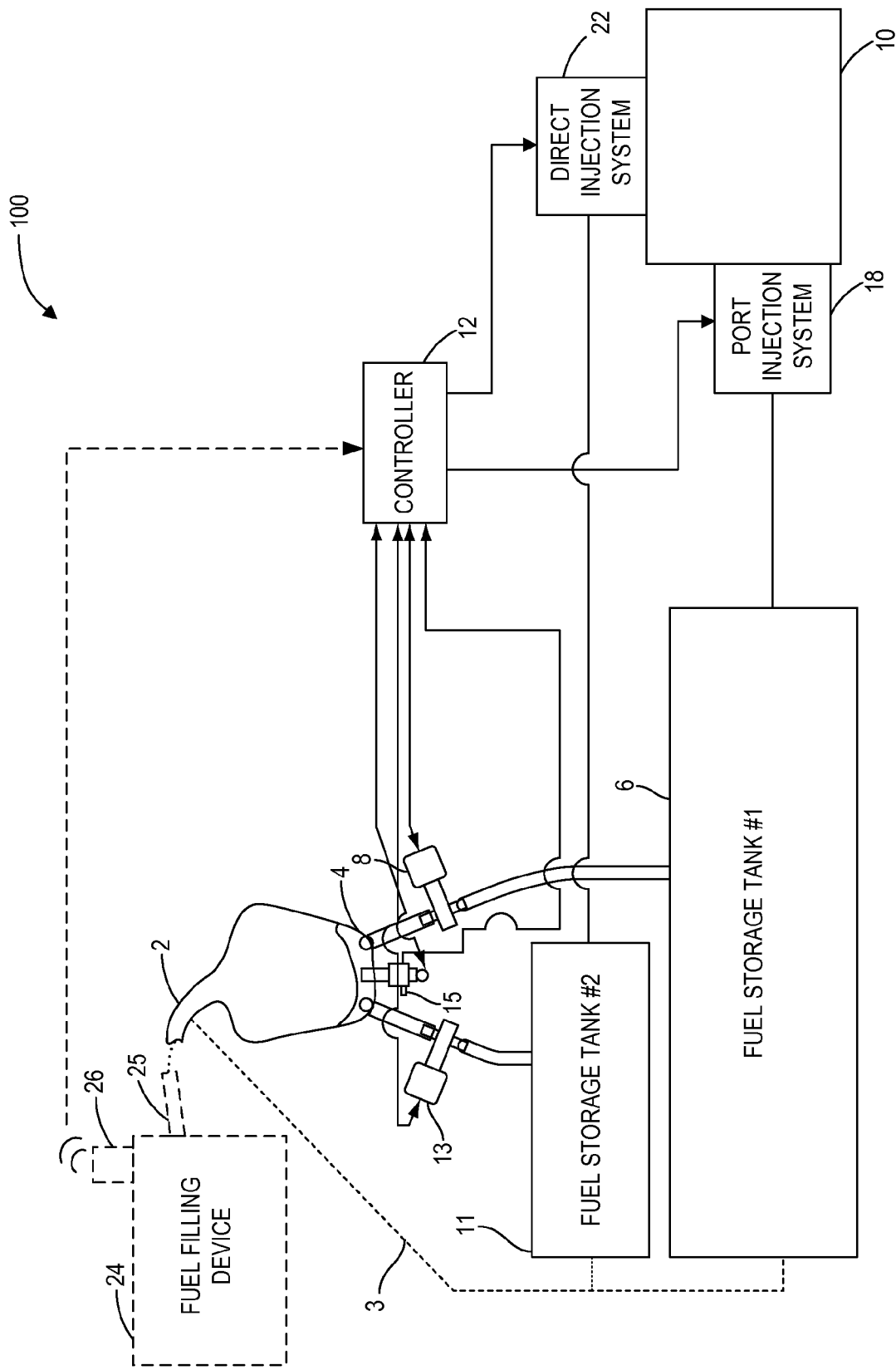
FIG. 1 is a schematic view of a vehicle including a fuel system as described herein.

FIG. 1 shows a schematic view of an example fuel system 100 configured to selectively direct a fuel supply to a plurality of storage tanks. The fuel system may be configured to receive fuel in a fuel reservoir and direct the fuel to a first or a second storage tank, dependent on the type of fuel received in the fuel reservoir. The fuel system may be further configured to selectively deliver fuel from the first and second storage tanks, to the engine, responsive to engine operation. As depicted in more detail with respect to FIG. 2, in one example, an engine includes a port fuel injection system and a direct fuel injection system in at least one of the cylinders of the engine, and the type of fuel injection system used may be dependent on the type of fuel flowing from the fuel storage tanks to the engine. Flowcharts illustrating example methods for selectively directing fuel to at least one storage tank, based on fuel type, are illustrated in FIG. 3 and FIG. 4. FIG. 5 is a flowchart illustrating an example method for determining fuel type delivery to the engine based on engine operating conditions.

FIG. 1 is a schematic view of a vehicle including a fuel system 100. The fuel system 100 may include a fuel fill neck 2 in fluid connection with a fuel reservoir 4, such that the fuel reservoir 4 receives a flow of fuel from the fuel fill neck 2. The fuel reservoir 4 may be configured to hold a predetermined amount of fuel for a period of time, before directing the fuel to one of two storage tanks, based on the fuel type as described herein. The fuel system 100 may include a first storage tank 6 in fluid connection with the fuel reservoir 4, arranged such that the first storage tank 6 is downstream of the fuel reservoir 4. A first fuelling valve 8, positioned downstream the fuel reservoir 4 and controlling fuel flow to the first storage tank 6, may be disposed fluidically between the fuel reservoir 4 and the first storage tank 6 such that adjusting the position of the first fuelling valve 8 controls the flow of fuel to the first storage tank 6. Further, a second storage tank 11 may be in fluid connection with the fuel reservoir 4 such that the second storage tank 11 is downstream of the fuel reservoir 4. A second fuelling valve 13, positioned downstream the fuel reservoir 4 and controlling fuel flow to the second storage tank 11, may be disposed fluidically between the fuel reservoir 4 and the second storage tank 11, such that adjusting the position of the second fuelling valve 13 controls the flow of fuel to the second storage tank 11. Thus, the fuelling valves selectively control flow to one or more of the storage tanks by positioning the fuelling valves based on the fuel type.

In one embodiment, fuel type may be detected by a fuel type sensor 15 (e.g., a chemical fuel type sensor) coupled to the fuel reservoir 4. The fuel type sensor 15 may be configured to detect a fuel type and send a fuel type signal to an electronic controller 12. In an alternate embodiment, a fuel type transmitter 26 may be coupled to a fuel device exterior to the vehicle (e.g., fuel filling device 24, fuel filling nozzle 25), such that a fuel type signal may be received at the electronic controller 12, from the fuel type transmitter 26. In one example, the fuel type transmitter 26 sends the fuel type signal to the electronic controller 12 wirelessly.

In yet another embodiment, the fuel type may be detected by a switching of a mechanical switch (not shown), which may be located in the fuel fill neck 2, or the fuel reservoir 4, as some examples. The mechanical switch may be configured to be selectively switched by an insertion of the fuel filling nozzle 25, for example responsive to a particular physical characteristic (e.g., length, texture, etc.) of the fuel filling nozzle 2. The mechanical switch may further be configured to send a fuel type signal to the electronic controller 12.

In any of the embodiments described herein, the electronic controller 12 may be configured to wirelessly receive the fuel type signal.

In response to the receiving of the fuel type signal, the electronic controller 12 may adjust positioning of one or more of the first fuelling valve 8 and the second fuelling valve 13, in this example. Thereby, the electronic controller 12 may control the degree of opening of the first and second fuelling valves to control the fuel flow from the fuel reservoir 4 into the first storage tank 6 and/or the second storage tank 11 based on the fuel type signal and/or a fuel level in one or more of the storage tanks. Thus, it may be appreciated that the first storage tank 6 and/or the second storage tank 11 may be configured to selectively receive a flow of fuel from the fuel reservoir 4.

In one example, the electronic controller 12 may be electrically connected to the first fuelling valve 8 and/or the second fuelling valve 13. In this way, the electronic controller 12 may be configured to send a signal to open the first fuelling valve 8 while sending a signal to keep the second fuelling valve 13 closed when a first fuel type (e.g., a fuel with low alcohol content, such as gasoline) is received in the fuel reservoir 4, in one example.

Alternately, the electronic controller 12 may send a signal to open the second fuelling valve 13 while sending a signal to close the first fuelling valve 8 when a second fuel type (e.g., a fuel with high alcohol content, such as ethanol) is received in the fuel reservoir 4. In yet another example, the electronic controller 12 may be configured to control both the first fuelling valve 8 and the second fuelling valve 13, or only one of the first fuelling valve 8 and the second fuelling valve 13.

Thus, it may be appreciated that the amount of fuel flow from the fuel reservoir 4 to one of the storage tanks may be determined based on the fuel type signal received at the electronic controller 12.

Further, the first storage tank 6 may be fluidically connected to a port injection (PI) system 18, and configured to deliver the first fuel type to the engine 10. Likewise, the second storage tank 11 may be fluidically connected to a direct injection (DI) system 22, and configured to deliver the second fuel type to the engine 10. One or more of the cylinders of the engine 10 may include one or more of a port injection system 18 and a direct injection system 22. In one example, fuel may be directly injected to at least one cylinder of the engine from the second storage tank, and fuel may be port injected to at least one cylinder of the engine from the first storage tank. In other examples, the fuel system may have only one type of fuel injection system. In still other examples, one or more cylinders may include both a port injection and a direct injection fuelling system.

Although the system is depicted as including two storage tanks in FIG. 1, it may be appreciated that any number of storage tanks, for example each with a respective fuelling valve, may be included in the fuel system and methods herein disclosed. Further, a storage tank may be independently coupled to an engine via a direct fuel injection system, a port fuel injection system, or a combination thereof. Further still, all of the storage tanks may be coupled to a same type of fuel injection system or each storage tank may be coupled to different types of fuel injection systems.

Figure 2:
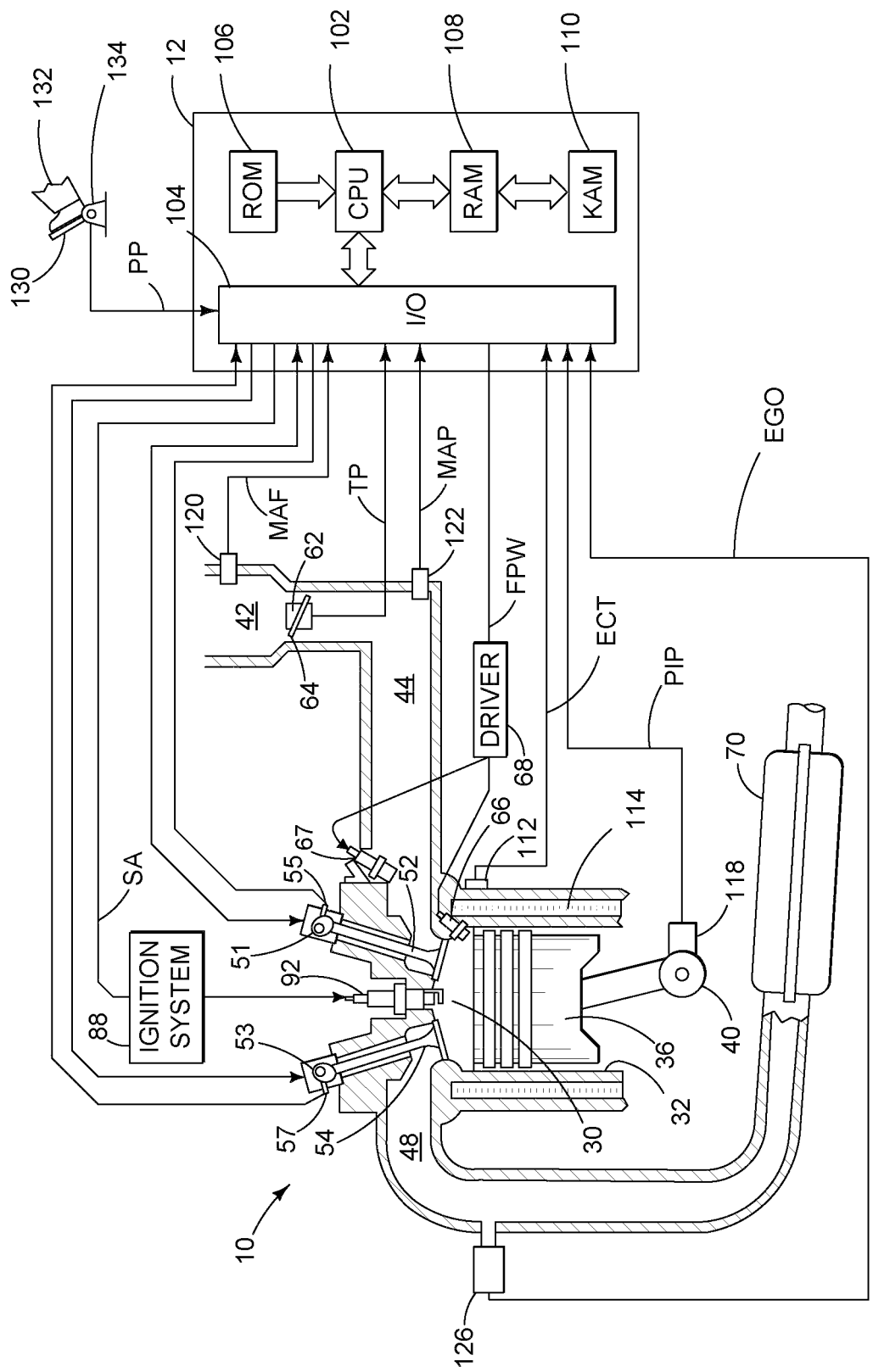
FIG. 2 is a schematic view of a cylinder of an engine of a vehicle.

Referring now to FIG. 2, a schematic diagram showing one cylinder of a multi-cylinder engine 10, which may be included in a propulsion system of an automobile. Engine 10 may be controlled at least partially by a control system including an electronic controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake fuelling valve 52 and exhaust fuelling valve 54. In some embodiments, combustion chamber 30 may include two or more intake fuelling valves and/or two or more exhaust fuelling valves.

In this example, intake fuelling valve 52 and exhaust fuelling valves 54 may be controlled by cam actuation via respective cam actuation systems 51 and 53. Cam actuation systems 51 and 53 may each include one or more cams and may utilize one or more of cam profile switching (CPS), variable cam timing (VCT), variable fuelling valve timing (VVT) and/or variable fuelling valve lift (VVL) systems that may be operated by electronic controller 12 to vary fuelling valve operation. The position of intake fuelling valve 52 and exhaust fuelling valve 54 may be determined by position sensors 55 and 57, respectively. In alternative embodiments, intake fuelling valve 52 and/or exhaust fuelling valve 54 may be controlled by electric fuelling valve actuation. For example, cylinder 30 may alternatively include an intake fuelling valve controlled via electric fuelling valve actuation and an exhaust fuelling valve controlled via cam actuation including CPS and/or VCT systems.

A fuel injector 66 is shown arranged in intake passage 44 in a configuration that provides what is known as direct injection of fuel into the combustion chamber 30. Fuel injector 66 may inject fuel in proportion to the pulse width of signal FPW received from electronic controller 12 via electronic driver 68. Fuel may be delivered to fuel injector 66 by a fuel system (not shown) including a storage tank, a fuel pump, and a fuel rail. In some embodiments, combustion chamber 30 may alternatively or additionally include a fuel injector coupled indirectly to combustion chamber 30 for injecting fuel in a manner known as port injection.

As depicted in FIG. 2, a fuel injector 67 is shown arranged in intake passage 44 in a configuration that provides what is known as port injection of fuel into the intake port upstream of combustion chamber 30. Fuel injector 67 may inject fuel in proportion to the pulse width of signal FPW received from electronic controller 12 via electronic driver 68. Fuel may be delivered to fuel injector 67 by a fuel system (not shown) including a storage tank, a fuel pump, and a fuel rail.

Intake passage 42 may include a throttle 62 having a throttle plate 64. In this particular example, the position of throttle plate 64 may be varied by electronic controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to electronic controller 12 by throttle position signal TP. Intake passage 42 may include a mass air flow sensor 120 and a manifold air pressure sensor 122 for providing respective signals MAF and MAP to electronic controller 12.

Ignition system 88 can provide an ignition spark to combustion chamber 30 via spark plug 92 in response to a spark advance signal SA from electronic controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Emission control device 70 can include multiple catalyst bricks, in one example. In another example, multiple emission control devices, each with multiple bricks, can be used. Emission control device 70 can be a three-way type catalyst in one example.

Electronic controller 12 is shown in FIG. 2 as a microcomputer, including microprocessor unit 2, input/output ports 104, an electronic storage medium for executable programs and calibration values shown as read only memory chip 106 in this particular example, random access memory 108, keep alive memory 110, and a data bus. Electronic controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by electronic controller 12 from signal PIP. Manifold pressure signal MAP from a manifold pressure sensor may be used to provide an indication of vacuum, or pressure, in the intake manifold. In one example, the engine position sensor 118 may produce a predetermined number of equally spaced pulses every revolution of the crankshaft from which engine speed (RPM) can be determined.

Storage medium read-only memory 106 can be programmed with computer readable data representing instructions executable by processor 2 for performing the methods described below as well as other variants that are anticipated but not specifically listed.

During operation, each cylinder within engine 10 typically undergoes a four stroke cycle: the cycle includes the intake stroke, compression stroke, expansion stroke, and exhaust stroke. During the intake stroke, generally, the exhaust fuelling valve 54 closes and intake fuelling valve 52 opens. Air is introduced into combustion chamber 30 via intake manifold 44, and piston 36 moves to an open position so as to increase the amount within combustion chamber 30. The position at which piston 36 is at its most open position (i.e. when combustion chamber 30 is at its largest amount) is typically referred to by those of skill in the art as bottom dead center (BDC). During the compression stroke, intake fuelling valve 52 closes and piston 36 moves so as to compress the air within combustion chamber 30. The point at which piston 36 is at it most closed position (i.e. when combustion chamber 30 is at its smallest amount) is typically referred to by those of skill in the art as top dead center (TDC).

In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the combustion forces piston 36 back to BDC. The crankshaft 40 converts this piston movement into a rotational torque of the rotary shaft. Finally, during the exhaust stroke, the exhaust fuelling valve 54 opens to release the burnt gas to exhaust manifold 48 and the piston returns to TDC. Note that the above is shown merely as an example, and that intake and exhaust fuelling valve opening and/or closing timings may vary, such as to provide positive or negative fuelling valve overlap, late intake fuelling valve closing, or various other examples.

An engine operation protocol utilizing various patterns of multiple injections and/or multiple ignitions is disclosed herein. According to one aspect of the disclosure, an appropriate injection/ignition strategy is selected according to current engine operating conditions in order to maximize port oxidation subject to combustion stability, while providing acceptable engine performance under warmed up operating conditions. This not only delivers the increased heat flux to the exhaust, but also reduces the hydrocarbon entering the inactive catalyst before it lights-off. According to the present disclosure, the currently described injection/ignition strategy offers increased flexibility. Specifically, injection can take place outside of the intake and compression strokes and ignition can take place outside of the expansion stroke.

In some embodiments, the engine may be coupled to an electric motor/battery system in a hybrid vehicle. The hybrid vehicle may have a parallel configuration, series configuration, or variation or combinations thereof.

As described above, FIG. 2 shows only one cylinder of a multi-cylinder engine, and that each cylinder may similarly include its own set of intake/exhaust fuelling valves, fuel injector, spark plug, etc.

Referring now to FIG. 3, an example method 300 for selectively fuelling a vehicle is illustrated. The method 300 may include receiving a fuel in a fuel reservoir in the vehicle at 310. The method may also include directing the fuel to one of a plurality of storage tanks based on a fuel type (e.g., alcohol content, octane level). In this example, it is determined if an alcohol (e.g., ethanol) content of a fuel is above a predetermined threshold $T_{ET}$ at 312. If the fuel is a first type with an ethanol content below a predetermined alcohol threshold $T_{ET}$, the routine may proceed to 314.

Selectively directing fuel to one of the plurality of storage tanks may be further based on a level of fuel in one or more storage tanks. Specifically, in this example, it is determined if the amount of fuel in a first storage tank is above a predetermined first amount threshold $T_1$ at 314. If the answer is no at 314, the method 300 may include directing the fuel from the fuel reservoir into a first storage tank by opening a first fuelling valve, positioned between the fuel reservoir and the first storage tank, and closing or maintaining closed a second fuelling valve, positioned between the fuel reservoir and the second storage tank, at 316, when a first fuel type (e.g., gasoline) is received in the fuel reservoir.

If the amount of fuel in the first storage tank is above a predetermined first amount threshold $T_1$ at 314, it may be determined if an amount of fuel in the second storage tank is above a predetermined second amount threshold $T_2$ at 318. If the answer is no at 318, fuel may be directed to the second storage tank by opening the second fuelling valve and closing, or maintaining closed, the first fuelling valve, at 320. If the answer is yes at 318 (e.g., the second storage tank is full), the routine may end, and fuelling may be stopped.

In another embodiment, if the answer is yes at 314 such that the amount of fuel in the first storage tank is above $T_1$, and it is desirable to segregate fuel types based on alcohol content to avoid mixing of fuels, etc, the routine may end (not shown). Particularly, there may be conditions where it is desirable to segregate fuel types based on a characteristic such as alcohol content and thus, if the storage tank for a first fuel type is full, fuelling of the vehicle will stop. However, as described above, there may be conditions wherein it is desirable to fill both tanks, irrespective of a fuel characteristic, such as alcohol content (e.g., vehicle has two storage tanks but is consistently fuelled with one fuel type). Thereafter, fuel supply to the engine may be differentially modulated, based on whether the fuel may or may not be directed to another tank if said storage tank is full.

Alternately, a second fuel type, with a higher alcohol (e.g., ethanol) content than the first fuel type, may be received at the fuel reservoir. Thus, the electronic controller may receive a fuel type signal indicating that the ethanol content is above a predetermined alcohol threshold at 312, and the routine may proceed to "4" in FIG. 4.

Referring now to method 400 illustrated in FIG. 4, if the amount of fuel in a second storage tank is not above a predetermined second amount threshold $T_2$ at 402, the fuel may be directed from the fuel reservoir into a second storage tank by opening the second fuelling valve, positioned between the fuel reservoir and the second storage tank, and closing or maintaining closed the first fuelling valve, positioned between the fuel reservoir and the first storage tank, at 404. However, if the answer is yes at 402, the routine proceeds to 406. If, at 406, the amount of fuel in the first storage tank is not above a predetermined first amount threshold $T_1$ at 406, the first fuelling valve may be opened and the second fuelling valve may be closed at 408 such that fuel may be transported from the fuel reservoir into the first storage tank. However, if the answer is yes at 406 (e.g., both storage tanks are full), the routine may end, and fuelling may stop. In another embodiment, if the answer is yes at 402 such that the amount of fuel in the second storage tank is above $T_2$, and it is desirable to segregate fuel types based on alcohol content to avoid mixing of fuels, etc., the routine may end (not shown).

In another example, selectively directing fuel to the storage tanks may be conducted with disregard to the amount of fuel in one or more storage tanks. That is, directing the fuel may include simply opening a first fuelling valve, positioned between the fuel reservoir and a first storage tank, while keeping a second fuelling valve, positioned between the fuel reservoir and a second storage tank, closed when a first fuel type is received at the fuel reservoir. In an alternate embodiment, when a second fuel type (e.g., with a higher alcohol content) is received at the fuel reservoir, selectively directing fuel may include opening the second fuelling valve while keeping the first fuelling valve closed when a second fuel type is received at the fuel reservoir.

Thus, it can be appreciated from FIGS. 3-4 that fuel is directed to one or more of the plurality of storage tanks by adjusting one or more fuelling valves positioned between the fuel reservoir and the plurality of storage tanks, in order to vary a direction of fuel flow to the plurality of storage tanks.

Further, it can be appreciated that fuel may be directed from the fuel reservoir into the first storage tank or second storage tank based on fuel level, or amount, in at least one of the first and second storage tanks, and/or fuel signals received at the electronic controller regarding other fuel characteristics (e.g., octane level).

For example, if the first fuel tank contains a level of fuel above a first full tank threshold, fuel may be directed to a second tank, even when the fuel is a fuel type that would otherwise be directed to the first tank. Similarly, if the second fuel tank contains a level of fuel above a second full tank threshold, the fuel may be directed to the first tank, even when the fuel is a fuel type that may otherwise be directed to the second tank. The fuel may be directed in this way by a fuel system including a drain tube 3 connecting the fuel reservoir to the first fuel tank and the second fuel tank. Such a drain tube may be useful when a user "tops off" the fuel tank (e.g., continues to fill fuel tank after a fuel filling nozzle has kicked off).

Although FIGS. 3-4 have illustrated an example method including adjusting the position of two valves, it may be appreciated that one valve may be used in another example method. For example, a switching valve or a 2-way valve, positioned between the fuel reservoir and a junction leading to two or more separate storage tanks, may be adjusted to selectively switch between one of two paths. Alternately, such a valve may be configured to selectively switch between one of two paths and a closed position, which may block flow to all paths. In an example fuel system with more than two tanks, a valve may be configured to select one of several positions (e.g., to close two storage tanks and direct flow to one storage tank). In yet another example with more than two storage tanks, a valve may be configured to selectively direct flow to more than one fuel storage tank. Further, there may be more than two valves for controlling the direction of fuel flow to a plurality of storage tanks.

It may also be appreciated that the fuelling valves may control the fuel flow to be partially directed to one storage tank, and partially directed to another storage tank or plurality of tanks. For example, a first fuelling valve may be mid-way open, and the second fuelling valve may be mid-way open, such that fuel is flowing equally or un-equally to first and second storage tanks.

Different fuels may be stored in a vehicle for use during different operating conditions. As described herein, a first fuel type (e.g., gasoline, for use when high engine performance is desired) may be directed to the first storage tank and a second fuel type, having a higher knock suppression (e.g., ethanol, for use in knock suppression) than a first fuel type, may be delivered to the second storage tank. Thus, it may be desirable to store a greater amount of gasoline, compared to an amount of ethanol, in the vehicle. Accordingly, the second storage tank (e.g., storing ethanol) may be smaller than the first storage tank (e.g., storing gasoline).

Referring now to FIG. 5, an example method 500 is shown for selectively delivering fuel from the first storage tank and/or the second storage tank to the engine, responsive to engine operating conditions, including engine knock and high engine pressure. Engine knock may be indicated by a signal from a knock sensor, cylinder pressure sensor, ionization sensor, or other indication that knock is occurring, or that engine pressure is high.

At 502, engine operating conditions (e.g., engine load, engine speed, operator-requested torque, spark timing, etc) may be determined. An amount or percentage of gasoline and ethanol to deliver to the engine may be determined at 504. At 506, a check for high engine pressure or engine knocking is conducted. This may occur when engine boost is requested, which may be requested automatically by a turbocharger or a supercharger, or manually by an operator, as some examples.

As is known in the field, by directing a fuel type with a higher alcohol amount to the engine, engine boost can be achieved while improving engine knock suppression. Thus, if the answer is yes at 506, the routine continues to 508 to check if delivery of more of a knock suppression substance (e.g., alcohol) is enabled. In other words, the routine determines whether conditions are acceptable to use a delivery of a knock suppression substance, for example, based on availability of knock suppression fluids, coolant temperature, time since an engine start, and/or combinations thereof. If not, the routine proceeds to 510 where spark timing can be retarded and/or boost can be reduced to thereby reduce the engine pressure. Additional action can be taken at 516, if necessary, such as reducing airflow, etc.

If the answer to 508 is yes, the routine proceeds to 512 to increase, or begin, delivery of a knock suppression substance or fluid, such as the second fuel type (e.g., ethanol) by enabling or increasing injection of the second fuel type, from the second storage tank, via the DI fuel injection system. Accordingly, delivery of the other fuel, such as the first fuel type (e.g., gasoline) can be decreased at 512. It may be appreciated that such changes in fuel delivery may be done, assuming that such changes are acceptable, given potential limits on increasing alcohol delivery under conditions that may increase likelihood of pre-ignition. For example, a desired ethanol amount or ratio to gasoline may be increased, but limited at values that may increase the likelihood of pre-ignition.

In other words, resort to spark retard and other operations as noted herein to reduce knock may be used if delivery of a knock suppressing fuel having alcohol, for example, is near a maximum available or allowed amount (e.g., due to limits related to pre-ignition). Thus, at 514, spark may be retarded relative to its current timing before or concurrent with the adjustment at 512, and then returned once the fuel adjustments have been effective. Further, other adjustments may be made, such as reducing manifold pressure, etc., as noted in 516. Note that the combination of spark timing and knock suppression fluid or substance adjustment may be beneficial in that the spark timing change may have a faster response on knock than the fuel change under some conditions. However, once the knock suppression fluid or substance adjustment has been effected, the spark timing may be returned to avoid fuel economy losses. In this way, fast response and low losses can be achieved. Under other conditions, only spark adjustments, or fuel adjustments without spark adjustments may be used so that even temporary retard of spark timing is reduced.

Another example method may include adjusting an absolute or relative amount of fuel delivered from the first storage tank to the engine, and the amount of fuel delivered from the second storage tank to the engine, responsive to an intake air boost level. For example, if the amount of intake air delivered to the engine is boosted, an adjustment to increase the amount of the second fuel type (e.g., ethanol) from the second storage tank may be made, to reduce the likelihood of knocking. In this way, fuel may be selectively delivered from the first and/or second storage tanks to a cylinder of the engine responsive to engine operating conditions and responsive to the boosting operation of a turbocharger coupled to the engine. Thus, it may be appreciated that it can be desirable to operate with flexible fuel type usage, as described above, in contrast to operating only with limited types of fuel.

If the answer is no at 506, (engine knocking is not detected), the routine may continue to deliver the first fuel type (e.g., gasoline) from the first storage tank to the engine, or may increase the amount of gasoline delivered at 518. Further, at 518, the amount of the second fuel type (e.g., ethanol) injected may be decreased. Thus, if engine pressure is not high and/or there is no engine knocking, improved engine efficiency may be achieved by using the first fuel type from the first storage tank. The first fuel type may be port injected into a cylinder of the engine from the first tank, in one example, as described above.

It may be appreciated that engine knocking is one example of an engine operating condition and an electronic controller, such as one described according to the disclosure herein, may be configured to selectively deliver fuel from a plurality of storage tanks to one or more engines, based on various engine operating conditions.

It may be further appreciated that fuel may be delivered from more than one storage tank concurrently, for example, when a particular ratio of gasoline to ethanol is desired. Also, more than one fuel type may be delivered to the engine via the same fuel injection system, via the same type of fuel injection system, via different fuel injection systems, and via different types of fuel injection systems.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. As such, the subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for selectively fuelling a vehicle, comprising:
  receiving a first fuel in a fuel reservoir in the vehicle;
  directing the first fuel to a first storage tank based on a first fuel type being sensed by a sensor coupled to, and projecting into, the fuel reservoir;
  receiving a second fuel in the reservoir;
  directing the second fuel to a second storage tank based on a second fuel type being sensed by the sensor; and
  supplying both fuels to an engine in the vehicle for combustion.

2. The method of claim 1, wherein directing the first fuel to the first storage tank and directing the second fuel to the second storage tank includes adjusting one or more fuelling valves positioned between the fuel reservoir and the first and second storage tanks to vary a direction of fuel flow to the first and second storage tanks.

3. The method of claim 2, wherein directing the first fuel to the first storage tank and directing the second fuel to the second storage tank includes opening a first fuelling valve, positioned between the fuel reservoir and the first storage tank, while keeping a second fuelling valve, positioned between the fuel reservoir and the second storage tank, closed when the first fuel type is received at the fuel reservoir, and opening the second fuelling valve while keeping the first fuelling valve closed when the second fuel type is received at the fuel reservoir.

4. The method of claim 1, wherein the sensor is a chemical fuel type sensor, the fuel type sensor sending a fuel type signal to an electronic controller.

5. A method for selectively fuelling a vehicle with an engine, comprising:
receiving a fuel in a fuel reservoir in the vehicle;
directing the fuel to one of a first and second storage tank based on a fuel type signal, the fuel type signal received at an electronic controller of the vehicle from a fuel type transmitter positioned exterior to the vehicle;
delivering fuel from the first storage tank to the engine and delivering fuel from the second storage tank to the engine; and
adjusting an amount of fuel delivered from the first storage tank to the engine and an amount of fuel delivered from the second storage tank to the engine, responsive to an engine operating condition.

6. The method of claim 4, wherein the electronic controller is configured to wirelessly receive the fuel type signal.

7. The method of claim 1, wherein directing the first fuel and directing the second fuel is further based on a level of fuel in at least one of the first and second storage tanks.

8. The method of claim 1,
wherein the first fuel is directed to the second storage tank when the level of fuel in the first storage tank is above a first full tank threshold, wherein the first fuel is directed via a drain tube coupling the fuel reservoir to the first storage tank and the second storage tank; and
wherein the second fuel is directed to the first storage tank when the level of fuel in the second storage tank is above a second full tank threshold, and wherein the second fuel is directed via the drain tube.

9. The method of claim 3, wherein the first fuel type is delivered to the first storage tank and the second fuel type, having a higher knock suppression than the first fuel type, is delivered to the second storage tank, wherein the second storage tank is smaller than the first storage tank.

10. The method of claim 9, wherein the second fuel type includes a higher alcohol content than the first fuel type.

11. The method of claim 9, further comprising selectively delivering fuel, from one or more of the first storage tank and the second storage tank to the engine, based on engine operating conditions, wherein selectively delivering fuel includes one or more of directly injecting fuel to at least one cylinder of the engine from the second storage tank, and port injecting fuel to at least one cylinder of the engine from the first storage tank.

12. A method for a vehicle, comprising:
receiving a first fuel in a fuel reservoir in the vehicle;
directing the first fuel to a first storage tank based on a first fuel type being sensed by a sensor coupled to the fuel reservoir;
receiving a second fuel in the reservoir;
directing the second fuel to a second storage tank based on a second fuel type being sensed by the sensor; and
delivering the first fuel from the first storage tank to the engine and delivering the second fuel from the second storage tank to the engine; and
adjusting an amount of fuel delivered from the first storage tank to the engine and an amount of fuel delivered from the second storage tank to the engine, responsive to an intake air boost level.

13. A method for a vehicle, comprising:
sensing a fuel type via a sensor coupled to a fuel reservoir;
directing sensed fuel from the reservoir to a first storage tank when a first fuel type is sensed; and
directing sensed fuel from the reservoir to a second storage tank when a second, different, fuel type is sensed;
delivering fuel from both tanks to an engine for combustion responsive to an intake air boost level.

14. The method of claim 13, wherein the sensor projects into the reservoir.

* * * * *